(No Model.)

J. P. HAGAN.
TRIMMING FOR CARRIAGES.

No. 303,840. Patented Aug. 19, 1884.

Witnesses.
S. N. Piper
E. B. Pratt

Inventor.
John Proctor Hagan.
by R. H. Eddy att'y.

UNITED STATES PATENT OFFICE.

JOHN PROCTOR HAGAN, OF SALISBURY, MASSACHUSETTS.

TRIMMING FOR CARRIAGES.

SPECIFICATION forming part of Letters Patent No. 303,840, dated August 19, 1884.

Application filed May 26, 1884. (No model.)

*To all whom it may concern:*

Be it known that I, JOHN PROCTOR HAGAN, of Salisbury, in the county of Essex, of the Commonwealth of Massachusetts, have invented a new and useful Improvement in Finishing-Bands or Trimming for Carriages, &c.; and I do hereby declare the same to be described in the following specification and represented in the accompanying drawings, of which—

Figure 1:
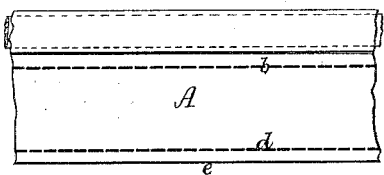
Figure 2:
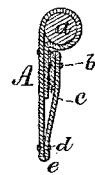
Figure 3:
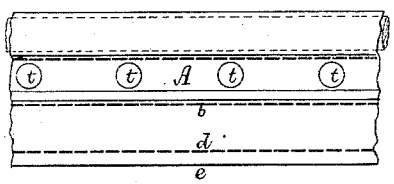
Figure 4:
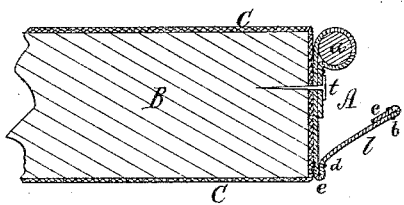
Figure 5:
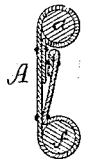

Figure 1 is a front view, and Fig. 2 a transverse section, of a piece of trimming of my improved kind. Fig. 3 is a front view, and Fig. 4 a transverse section, of part of a carriage-seat covered with cloth, and having a finishing-strip of my improved kind screwed to it. Fig. 5 is a transverse section of the trimming as provided with two stiffening-cords, $a$ and $f$. It is intended for use as a finish to the edges of seats or various other parts of a vehicle that are usually covered with cloth.

The trimming is composed of a strip, A, of leather or other suitable material, of proper width. It is first, near one edge of it, bent closely around a cord, wire, or strip of ratan, $a$, and afterward, near the said edge, it is sewed to the lower part extending below the stiffener $a$. Next, near its opposite edge, it is folded in or down upon itself, as shown at $c$, and the lap or fold is fastened to the strip by a line of sewing, $b$. Next, the strip is folded near its middle upon itself, so as to carry the last-named fold up to the fold extending around the stiffening. Finally, a line of stitching, $d$, is carried through the piece near its lower edge, $e$. The article then will be in a condition for use. If, now, we suppose B, Fig. 4, to represent a carriage-seat covered on its upper and lower surfaces and front edge with cloth C, the trimming A, with its front flap turned down, as shown at $l$, is to be laid on the cloth at the edge of the seat, and secured thereto and to the seat by nails or tacks $t$, driven through the part against the seat and cloth and into the seat, after which the said flap is to be turned up over and so as to cover the row of tacks, and is to be glued or cemented to their heads and to the fastened part of the trimming, so as to hide the tacks from view and make a "finish" to the seat.

Sometimes I place within the lower bend or fold of the trimming a cord or stiffener, $f$, like that shown at $a$, in which case the trimming would be in transverse section, as represented in Fig. 5.

In some cases, when the trimming is used around the edge of a chair-seat covered with leather or cloth, it may be secured thereto by brass-headed nails driven through the trimming, so as to have their heads exposed on the outer surface of such trimming.

I claim—

As a new or improved article of manufacture, the carriage-trimming, substantially as described, consisting of the strip of leather or other suitable material folded near its opposite edges and middle, and a row of stitching in each fold, and a stiffening cord or band in the upper one, as represented, such trimming also, if required, having another such cord or band in its lower fold, all being substantially and for use as set forth.

JOHN PROCTOR HAGAN.

Witnesses:
 HORACE I. BARTLETT,
 CHARLES W. MORRILL.